United States Patent [19]

Gentry

[11] 4,442,859

[45] Apr. 17, 1984

[54] CONTROL VALVE

[75] Inventor: Ernest B. Gentry, Dallas, Tex.

[73] Assignee: Otis Engineering Corporation, Dallas, Tex.

[21] Appl. No.: 263,163

[22] Filed: May 13, 1981

[51] Int. Cl.³ .................... F16K 15/00; F16K 31/143
[52] U.S. Cl. .................................... 137/242; 137/239;
137/522; 137/538; 137/543.23; 166/84; 251/14;
251/63.5; 277/24; 277/73
[58] Field of Search ............... 137/240, 522, 523, 538,
137/543.23, 239, 242, 244; 166/82, 84; 251/14,
63.5; 277/24, 31, 32, 73

[56] References Cited

U.S. PATENT DOCUMENTS

| | | | |
|---|---|---|---|
| 1,923,621 | 8/1933 | Hennebőhle | 137/543.23 |
| 2,298,646 | 10/1942 | Ovens | 137/522 |
| 3,099,999 | 8/1963 | Vismara | 137/543.23 |
| 3,532,163 | 10/1970 | Ecuer | 166/84 |
| 3,650,294 | 3/1972 | Satoh | 137/538 |
| 3,762,725 | 10/1973 | Taylor | 166/84 |
| 3,831,676 | 8/1974 | Brown et al. | 166/84 |
| 3,939,910 | 2/1976 | Bruce | 166/84 |
| 3,943,969 | 3/1976 | Rubin et al. | 137/538 |
| 4,085,772 | 4/1978 | Roger | 137/522 |

FOREIGN PATENT DOCUMENTS

| | | | |
|---|---|---|---|
| 1188022 | 4/1970 | United Kingdom | 137/522 |
| 1258604 | 12/1971 | United Kingdom | |

Primary Examiner—George L. Walton
Attorney, Agent, or Firm—Thomas R. Felger

[57] ABSTRACT

A valve which controls either the injection of fluid from an exterior source into the interior of the valve housing or the exhausting of fluid pressure from the valve housing. The valve is especially adapted for controlling the injection of fluid into a wireline lubricator assembly. Alternative means are provided for opening and closing the valve. Preferably a metal-to-metal seal is used to control fluid flow.

8 Claims, 10 Drawing Figures

CONTROL VALVE

BACKGROUND OF THE INVENTION

1. Field of the Invention

The present invention relates to a valve for controlling fluid flow. One function of the valve is to allow injection of fluid from a source exterior to the valve to within the valve interior.

2. Description of the Prior Art

The embodiments of the present invention shown within the application are especially adapted for use within a wireline lubricator for servicing oil and gas wells. U.S. Pat. No. 3,831,676 to Vernon L. Brown and Joseph L. Pearce discloses a stuffing box for attachment to a lubricator to seal around a wireline. U.S. Pat. No. 3,762,725 to Donald F. Taylor discloses a stuffing box and a sealing gland which uses hydraulic fluid to vary the force with which the sealing gland engages a wireline disposed therein. Both patents provide details concerning the use of wireline lubricators and are incorporated by reference for all purposes within this application.

SUMMARY OF THE INVENTION

The present invention discloses a valve comprising a housing having a first longitudinal passageway therethrough, a poppet means slidably disposed within the first longitudinal passageway, the poppet means having a longitudinal bore extending at least partially therethrough, first seal means for blocking fluid flow between the exterior of the poppet means and the interior of the first longitudinal passageway, second seal means for blocking fluid flow between the exterior of the poppet means and the interior of the first longitudinal passageway, the first and second seal means spaced longitudinally from each other and partially defining a fluid chamber within the first longitudinal passageway, port means for communicating fluid from the exterior of the housing to the fluid chamber, the poppet means having a first position in which the first seal means blocks fluid communication between the chamber and other portions of the first longitudinal passageway and a second position in which the first seal means allows fluid communicaton between the chamber and other portions of the first longitudinal passageway, means for biasing the poppet means towards its first position, an opening through the poppet means communicating between the longitudinal bore and the first longitudinal passageway, and the first seal means located between the opening and the fluid chamber.

One object of the present invention is to provide a valve which will allow fluid injection into the interior of the valve from an exterior source.

Another object of the present invention is to provide a valve which will allow controlled exhausting or purging of fluid from within the valve.

A further object of the present invention is to provide a valve which can be controlled by increasing fluid pressure from a source exterior to the valve above a preselected value and/or by manipulating a wireline extending through the valve.

Still another object of the present invention is to provide a valve having a housing and poppet means slidably disposed therein which engage each other to form a metal-to-metal seal. Preferably, the poppet means has a tapered outside diameter portion which engages a square annular shoulder or ring within the housing to form a sharp line contact.

A still further object of the present invention is to provide a valve adapted for use within a wireline lubricator assembly. The valve can be used to inject fluids from an exterior source into the lubricator or exhaust fluids from within the lubricator.

Additional objects and advantages of the present invention will be readily apparent to those skilled in the art from reading the following written description in conjunction with the drawings and claims.

DESCRIPTION OF THE PREFERRED EMBODIMENTS

Figure 1:
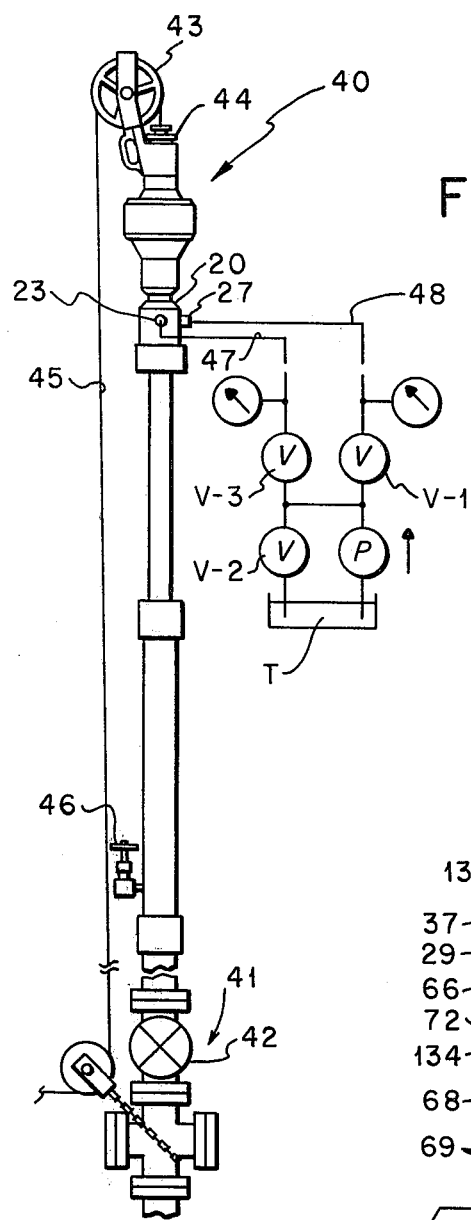
FIG. 1 is a schematic view in elevation of a wireline lubricator assembly mounted on a wellhead.

In FIG. 1, lubricator assembly 40 is shown attached to a standard wellhead 41. The bore of lubricator assembly 40 is axially aligned with wellhead 41 such that when valve 42 is opened, a wireline tool string (not shown) can be lowered through the wellbore (not shown) by conventional wireline techniques to a downhole location and returned to the well surface. Lubricator assembly 40 includes sheave 43 for guiding wireline 45 and stuffing box 44 for sealing around wireline 45 as it enters lubricator assembly 40. A manual bleed valve 46 is provided to allow for depressurizing lubricator assembly 40 after valve 42 has been closed. Standard operating procedures require opening bleed valve 46 prior to disconnecting lubricator assembly 40 from wellhead 41.

Under some well conditions such as high hydrogen sulfide contamination of the well fluids, it is necessry to inject a chemical inhibitor into the lubricator assembly to protect the wireline from chemical corrosion. Also, on high pressure wells, it is sometimes preferable to purge or bleed off pressure within lubricator 40 from a remote location prior to opening manual bleed valve 46.

Figure 4:
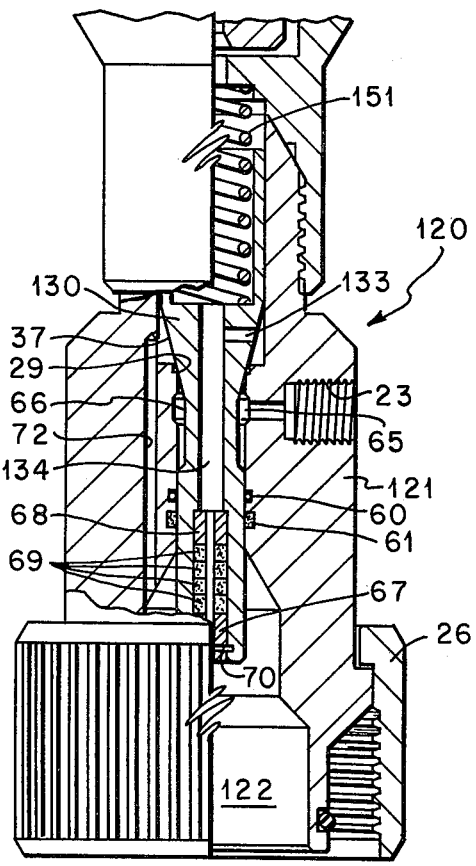
FIG. 4 is a drawing, partially in section and partially in elevation with portions broken away, showing an alternative embodiment of the present invention incorporated into a purge and injection control valve within a portion of a wireline lubricator assembly.
Figures 2B, 3:
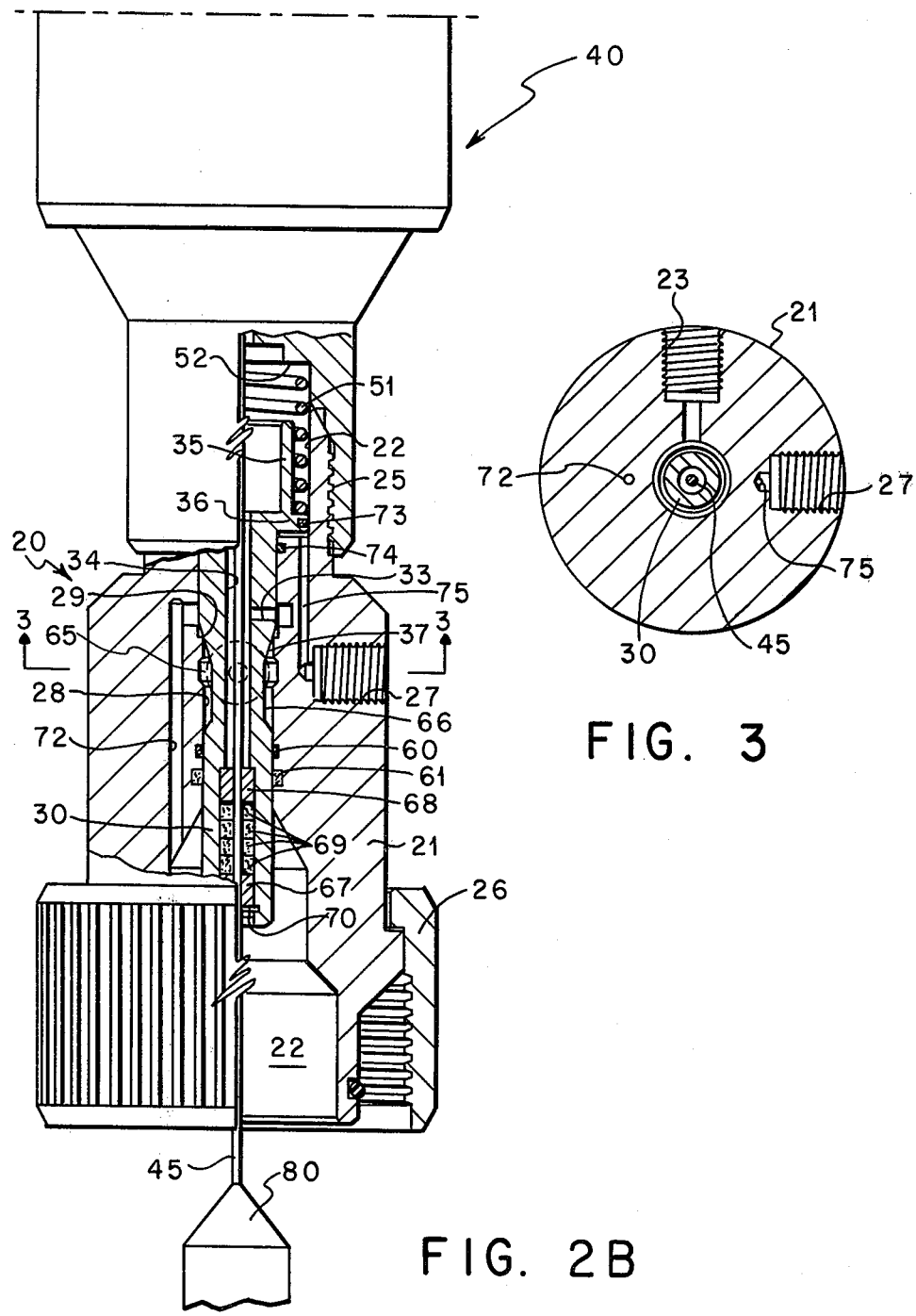
FIG. 3 is a horizontal cross-section taken on line 3—3 of FIG. 2B.

The embodiments of the present invention shown in the valves of FIGS. 2B and 4 can be used both to control the injection of fluid into lubricator assembly 40 and to purge or exhaust fluids therefrom. The embodiment of the present invention shown in FIG. 8 controls only the injection of fluid into a lubricator.

Figure 2A:
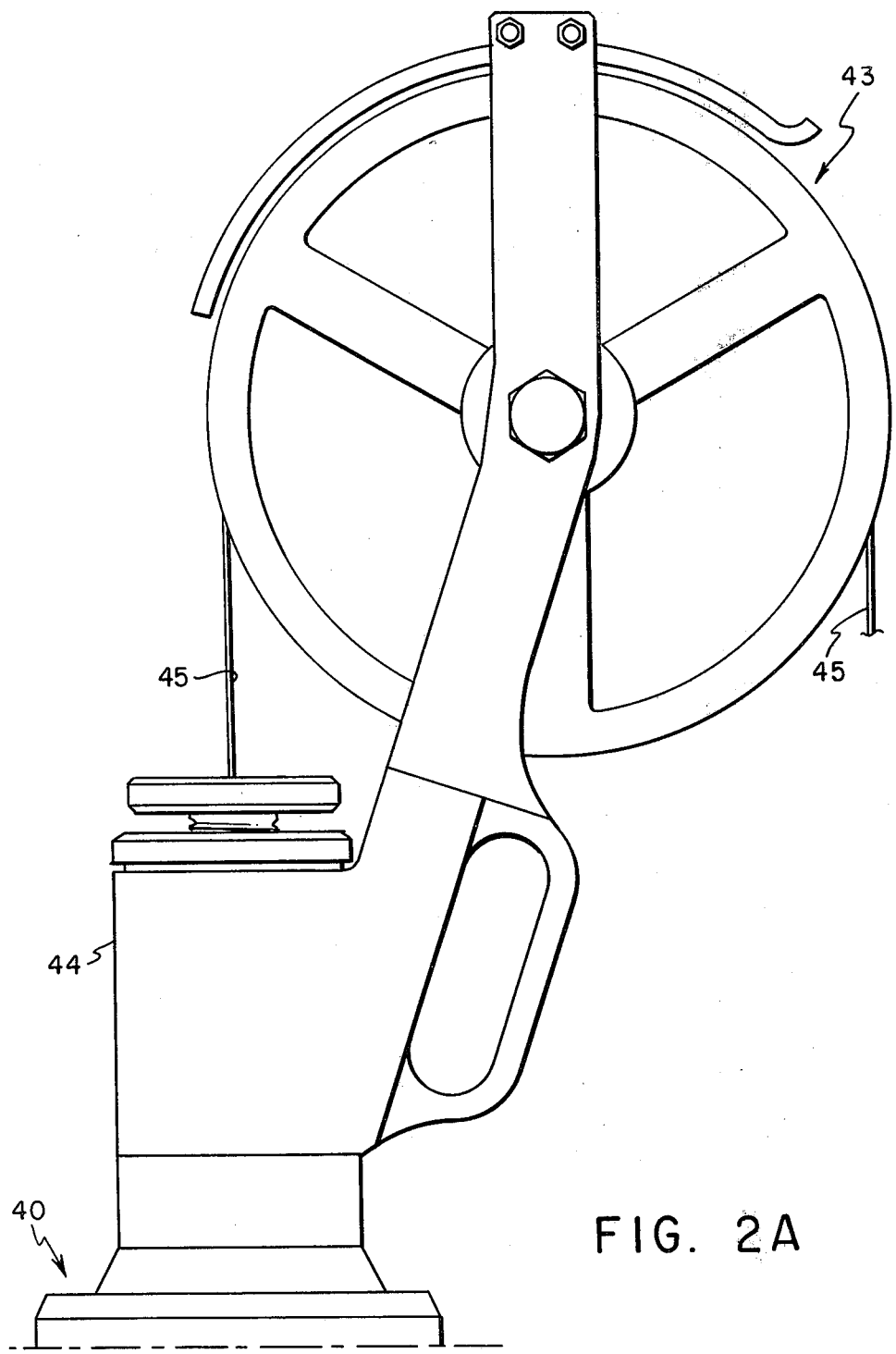
FIGS. 2A and 2B are enlarged views, partially in elevation and partially in section, showing the upper section of a wireline lubricator with portions cut away to disclose a purge and injection control valve incorporating the present invention.

In FIG. 1, valve 20 forms a part of the upper section of lubricator assembly 40. FIGS. 2A and 2B show the upper section in more detail. Valve 20 includes housing 21 with threads 25 on one end and quick union coupling 26 on the other end to provide means for attaching housing 21 to lubricator assembly 40.

Housing 21 has first longitudinal passageway 22 extending therethrough. Passageway 22 is concentrically aligned with the bore of lubricator assembly 40 when threads 25 and coupling 26 are made up with the other sections of lubricator assembly 40. First port means 23 extends radially through housing 21 and communicates fluid between the exterior of housing 21 and first longitudinal passageway 22. For the embodiment shown in FIG. 2B, a second port means 27 is also provided. Both port means 23 and 27 have threads formed on their inside diameter for attachment of fluid lines 47 and 48.

As best shown in FIG. 1, valves V-1, V-2, and V-3 can be operated to direct fluid pressure from pump P to port means 23 and/or 27. Valves V-1, V-2, and V-3 can also be operated to exhaust or purge fluids from port means 23 and/or 27 into tank T. Various designs of valves, pumps, and tanks exterior to lubricator assembly 40 can be selected depending upon the fluids to be injected through valve 20 or exhausted from valve 20.

Figure 8:
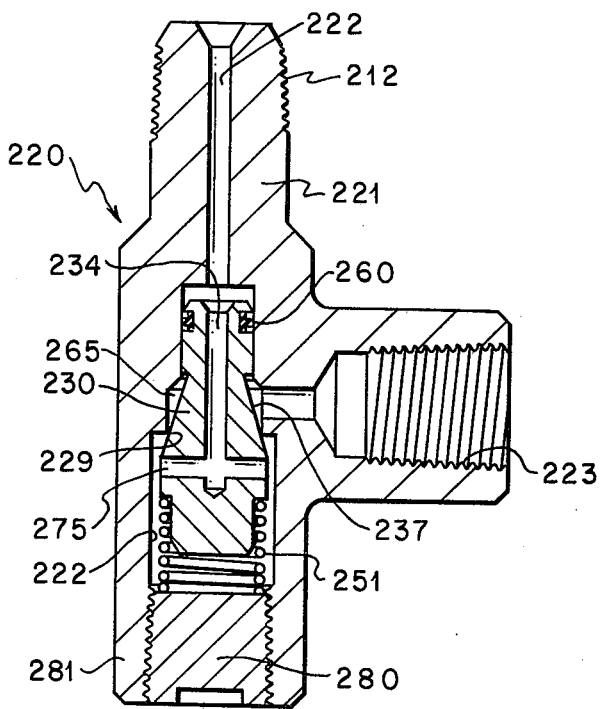
FIG. 8 is a drawing in longitudinal section of another alternative embodiment of the present invention incorporated into an injection control valve.

The three embodiments of the present invention shown in FIGS. 2B, 4, and 8 vary principally in the configuration of the poppet means which is slidably disposed within the first longitudinal passageway of each valve. In each embodiment, the poppet means is generally cylindrical with a longitudinal bore extending at least partially therethrough. Also, each poppet means 30, 130, and 230 has a tapered outside diameter portion sized to engage a metal seat formed within the respective first longitudinal passageway.

Referring to FIG. 2B, poppet means 30 is shown slidably disposed within first longitudinal passageway 22. Longitudinal bore 34 extends through poppet means 30 with wireline 45 extending therethrough. One end 35 of poppet means 30 has spring 51 disposed around its outside diameter. One end of spring 51 abuts shoulder 52 within assembly 40, and the other end of spring 51 abuts flange 36 on the exterior of poppet means 30.

First longitudinal passageway 22 has a reduced inside diameter portion 28 with a sharp rim or ring 29 formed at the change in inside diameter. Poppet means 30 has a tapered outside diameter portion 37 which is sized to engage ring 29. Engagement between taper 37 and ring 29 provides a first seal means for blocking fluid flow between the exterior of poppet means 30 and the interior of first longitudinal passageway 22. This engagement between taper 37 and ring 29 also defines the first position of poppet means 30 as shown in FIG. 2B. Spring 51 provides means for biasing poppet means 30 towards its first position. Poppet means 30 has a second position (not shown) in which taper 37 is spaced longitudinally from ring 29 allowing fluid communication therebetween.

Ring 29 within housing 21 can be replaced by elastomeric material and/or tapered to match taper 37 to form the first seal means. Preferably, ring 29 presents a sharp rim towards taper 37 forming a very thin metal-to-metal line contact when poppet means 30 is in its first position. An important feature of this invention is that each embodiment provides this fine line metal-to-metal contact for the first seal means.

Reduced inside diameter portion 28 also carries elastomeric seal ring 60 within an appropriate recess spaced longitudinally from ring 29. The outside diameter of poppet means 30 adjacent to elastomeric seal ring 60 is uniformly cylindrical and maintains constant sealing contact with ring 60 as poppet means 30 is shifted between its first and second positions. The engagement between seal ring 60 and poppet means 30 provides second seal means for blocking fluid flow between the exterior of poppet means 30 and the interior of first longitudinal passageway 22. Felt wiper 61 is carried by reduced inside diameter portion 28 within an appropriate recess spaced longitudinally from elastomeric seal ring 60. Felt wiper 61 protects ring 60 by preventing sand, grit, or other fine particles on the exterior of poppet means 30 from contacting ring 60.

The first and second seal means partially define fluid chamber 65 between metal ring 29 and elastomeric ring 60. Fluid chamber 65 is also defined by recess 66 in the exterior of poppet means 30. Port means 23 also communicates with chamber 65.

Opening 33 is drilled radially through poppet means 30 to communicate fluid between longitudinal bore 34 and first longitudinal passageway 22. A wiper assembly is disposed around wireline 45 near the other end of longitudinal bore 34. The wiper assembly consists of spacers 67 and 68 which position felt rings 69 within bore 34. Snap ring 70 is used to hold the spacers 67 and 68 and felt rings 69 in place. This wiper assembly removes sand, grit, or other particulate material from wireline 45 minimizing damage to the components of lubricator assembly 40 above valve 20.

Housing 21 includes a second longitudinal passageway 72 which is spaced radially from first longitudinal passageway 22. Passageway 72 communicates with first longitudinal passageway 22 on either end of fluid chamber 65.

Flange 36 on end 35 of poppet means 30 carries a piston seal 73 to form a sliding seal with first longitudinal passageway 22 adjacent thereto. Stationary seal 74 is carried within first longitudinal passageway 22 to engage the exterior of poppet means 30. Seal 74 is spaced longitudinally from piston seal 73. Third longitudinal passageway 75 is provided to communicate between port means 27 and the portion of first longitudinal passageway 22 between piston seal 73 and stationary seal 74. The diameter of piston seal 73 is larger than the diameter of seal 74. Therefore, increasing fluid pressure from port means 27 creates a force on flange 36 opposite to spring 51. When the fluid pressure acting on piston seal 73 exceeds a preselected value, spring 51 will be compressed allowing poppet means 30 to shift to its second position.

Opening 33 is longitudinally positioned between stationary seal 74 and the portion of taper 37 which engages ring 29. Therefore, when poppet means 30 is in its first position, the first seal means blocks fluid communication between chamber 65 and other portions of first longitudinal passageway 22. When poppet means 30 is in its second position, fluid can communicate from the portion of first longitudinal passageway 22 below fluid chamber 65 through second longitudinal passageway 72 past taper 37 and ring 29 into fluid chamber 65 and port means 23. With poppet means 30 in its second position, fluid can also communicate from port means 23 and chamber 65 past taper 37 and ring 29 through opening 33 and into longitudinal bore 34. Thus, shifting poppet means 30 to its second position allows exhausting of fluid pressure from lubricator assembly 40 or injecting fluid into longitudinal bore 34 to coat wireline 45.

OPERATING SEQUENCE

Poppet means 30 within valve 20 can be shifted to its second position by three separate means.

First, fluid pressure from pump P can be directed against piston seal 73 to overcome spring 51 and any fluid pressure acting upon taper 37 to maintain poppet means 30 in its first position. After poppet means 30 has moved to its second position, fluid can either be injected through port means 23 or exhausted from port means 23 depending upon the position of valves V-1, V-2, and V-3. When fluid pressure from pump P decreases below a preselected value, spring 51 and/or fluid pressure within lubricator assembly 40 will return poppet means 30 to its first position.

Second, fluid pressure can be injected by pump P through port means 23 until the injected pressure exceeds the force of spring 51 and any fluid pressure acting upon the opposite side of the first seal means. This method is particularly useful for injecting small amounts of fluid into longitudinal bore 34.

Third, wireline 45 can be retrieved or pulled up until rope socket 80 contacts the other end of poppet means 30. Continued pulling on wireline 45 will overcome spring 51 and shift poppet means 30 to its second position. This method is particularly useful for remotely purging pressure from within lubricator assembly 40 prior to opening manual valve 46.

ALTERNATIVE EMBODIMENTS

Figure 5:
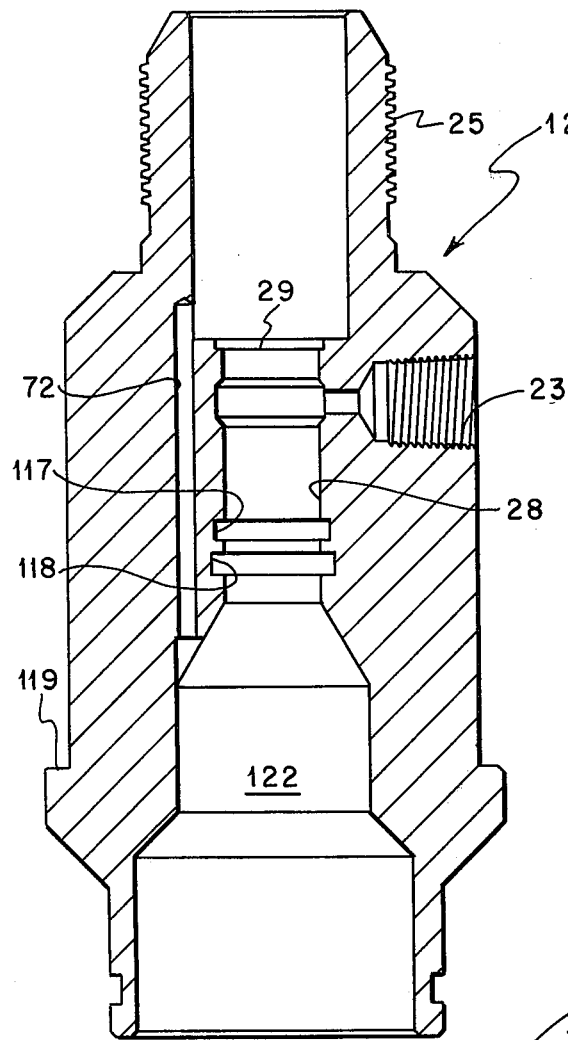
FIG. 5 is a drawing in longitudinal section showing a housing designed to incorporate the valve of the present invention and to be made up as part of a wireline lubricator assembly.
Figure 6:
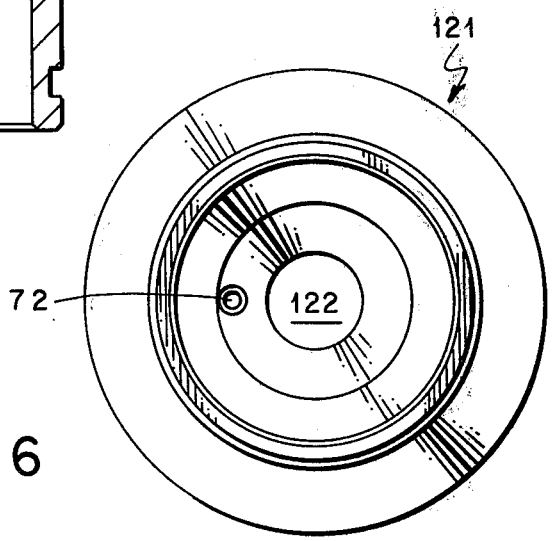
FIG. 6 is an end view of the housing shown in FIG. 5.

Valve 120 and its various components shown in FIGS. 4, 5, and 6 represent an alternative embodiment of the present invention. Valve 120 is similar in function to previously described valve 20 except valve 120 has only two means for shifting poppet means 130 from its first to its second position.

Valve 120 includes housing 121 which is similar to previously described housing 21. Housing 121 has threads 25 on one end for attachment to a lubricator assembly. Exterior flange 119 is provided near the other end of housing 121 to engage with coupling 26. First longitudinal passageway 122 which extends through housing 121 is concentrically aligned with the bore of the lubricator assembly when valve 120 has been installed.

FIG. 5 shows recess 117 into which elastomeric seal ring 60 is inserted and recess 118 into which felt wiper 61 is inserted. Housing 121 has port means 23 communicating between the exterior of valve 120 and first longitudinal passageway 122. However, port means 27 and third longitudinal passageway 75 are not present in housing 121. Second longitudinal passageway 72 is formed within housing 121 and serves the same function as previously described for valve 20. Rim or ring 29 is more clearly shown in FIG. 5. Ring 29 preferably has a very sharp edge or corner to form a fine line contact with tapered surface 37 on poppet means 130.

Figure 7:
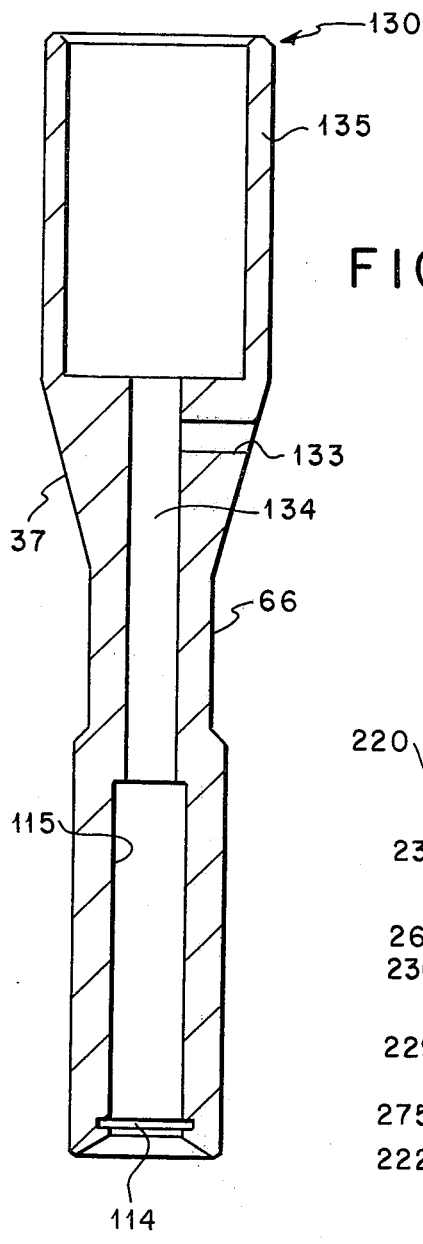
FIG. 7 is an enlarged drawing in longitudinal section of the poppet means of the present invention which can be slidably disposed within the housing shown in FIG. 5.

Poppet means 130 which can be slidably disposed within first longitudinal passageway 122 is best shown in FIG. 7. Longitudinal bore 134 extends through poppet means 130 with opening 133 communicating between bore 134 and the exterior of poppet means 130.

The major difference between poppet means 30 and poppet means 130 is that one end 135 of poppet means 130 does not carry a flange 36 and piston seal 73. As shown in FIG. 4, biasing means or spring 151 is disposed within the enlarged porton of longitudinal bore 134 which comprises end 135 of poppet means 130. Biasing means or spring 51 of valve 20 is disposed around the exterior of end 35 of poppet means 30. Recess 115 is formed in the other end of longitudinal bore 134 and is sized to receive spacers 67 and 68 and felt rings 69 as shown in FIG. 7. Groove 114 which is engaged by snap ring 70 to secure the wiper assembly within recess 115 is also shown.

OPERATING SEQUENCE

Poppet means 130 within valve 120 can be shifted to its second position by two separate means.

Poppet means 130 is shown in its first position in FIG. 4. Fluid pressure from a suitable source exterior to valve 120 can be injected through port means 23 into fluid chamber 65. Fluid chamber 65 is partially defined by recess 66 in the exterior of poppet menas 130, sealing contact between taper 37 and ring 29 to form the first seal means, and sealing contact between elastomeric seal ring 60 and the exterior of poppet means 130 to form the second seal means. When the force of fluid pressure within chamber 65 acting upon one side of the first seal means exceeds the force of spring 151 plus fluid pressure within first longitudinal passageway 122 acting upon the other side of the first seal means, poppet means 130 will shift longitudinally in one direction creating a gap or space between taper 37 and ring 29. This is defined as the second position for poppet means 130. Fluid from chamber 65 can then flow into bore 134 through opening 133 and/or communicate with other portions of first longitudinal passageway 122. Elastomeric ring 60 and the exterior of poppet means 130 adjacent thereto are sized to maintain a fluid barrier as poppet means 130 shifts between its first and second positions.

A wireline extends through longitudinal bore 134 during normal operations. The wireline can be retrieved or pulled up until a rope socket such as shown in FIG. 2B abuts the other end of poppet means 130 and shifts poppet means 130 towards its second position. Mechanically shifting poppet means 130 with the wireline establishes a purge or exhaust path from first longitudinal passageway 122 below fluid chamber 65 through second longitudinal passageway 72, past the gap between taper 37 and ring 29, into fluid chamber 65, and out through port means 23. As previously noted for valve 20, shifting poppet means 130 to its second position by wireline movement from a remote location is a preferred method for purging a lubricator assembly prior to opening a manual bleed valve on the lubricator assembly.

ALTERNATIVE EMBODIMENT

Figure 9:
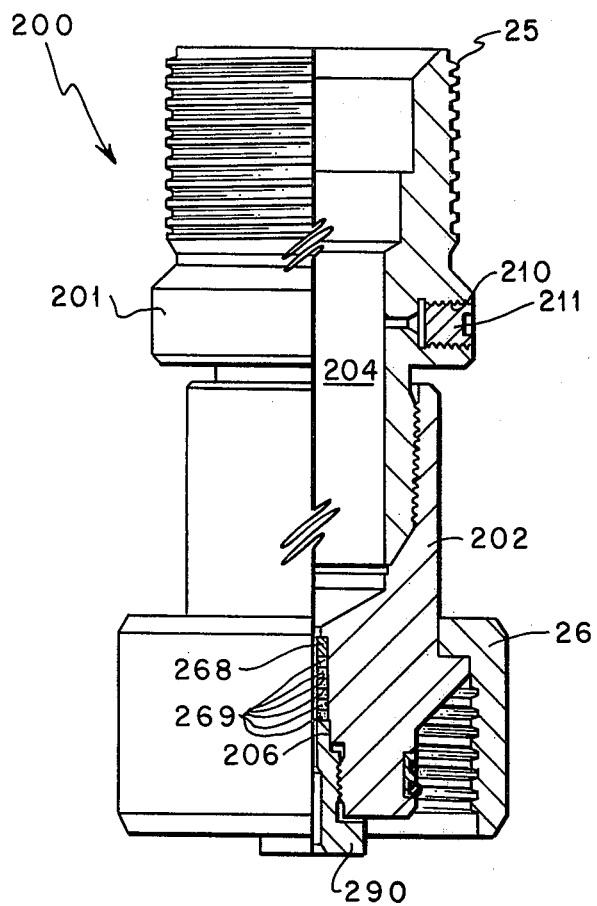
FIG. 9 is a drawing, partially in section and partially in elevation, of a section of a wireline lubricator which can receive the injection control valve of FIG. 8.

Another alternative embodiment of the present invention is shown in FIGS. 8 and 9. Section 200 of a wireline lubricator assembly is shown in FIG. 9 consisting of two threadedly engaged subsections 201 and 202. Subsection 201 carries threads 25 on one end, and subsection 202 carries coupling 26 which allows making up section 200 as part of a wireline lubricator assembly. Bore 204 extends longitudinally through subsection 201 and communicates with a reduced diameter opening 206 through subsection 202. During normal operation a wireline (not shown) extends through bore 204 and opening 206. Preferably, spacer 268 and felt rings 269 are disposed within opening 206 and surround the wireline. Nut 290 is threadedly engaged with opening 206 to allow varying the compression of felt rings 269. Nut 290, felt rings 269, and spacer 268 provide a wiper assembly to prevent sand, grit, and other particulate material from entering bore 204 during wireline operations.

Port means 210 is provided through the exterior of subsection 201 to communicate with bore 204. Under normal well conditions, plug 211 is inserted into port means 210 to prevent fluid communication through port means 210. For some well conditions such as $H_2S$ contamination of the well fluids, it may be necessary to inject a chemical inhibitor into bore 204 to protect the wireline. In this case, plug 211 can be removed and valve 200, shown in FIG. 8, inserted into port means 210. Threads 212 on housing 221 are sized to be engaged with threads on the interior of port means 210.

Valve 220 includes housing 221 with first longitudinal passageway 222 extending therethrough. The inside diameter of passageway 222 near one end 281 is enlarged to allow installation of poppet means 230. Plug 280 is threadedly engaged with one end 281 to seal passageway 222 after installation of poppet means 230. Sharp rim or ring 229 is formed within first longitudinal passageway 222 by the change in inside diameter. Tapered surface 237 on the exterior of poppet means 230 engages ring 229 to form the first seal means. Poppet means 230 also has T-seal 260 on its exterior to form a fluid tight barrier with the inside diameter of first longitudinal passageway 222.

The first position of poppet means 230 is shown in FIG. 8. In the first position, spring 251 biases taper 237 to contact ring 229. First seal means formed by contact between taper 237 and ring 229 and second seal means formed by contact between T-seal 260 and passageway 222 prevent fluid communication between longitudinal passageway 222 and port means 223.

Port means 223 communicates with fluid chamber 265 which is partially defined by the first and second seal means. Poppet means 230 has longitudinal bore 234 extending partially therethrough. Another bore 275 is drilled radially through poppet means 230 and intersects with bore 234. Radial bore 275 provides openings to equalize fluid pressure on opposite sides of fluid chamber 265 within first longitudinal passageway 222 through bore 234.

OPERATING SEQUENCE

Valve 220 is designed to only control injection of fluid into a wireline lubricator assembly. After removing plug 211 and installing valve 220 in the side of lubricator section 200, a suitable hose or pipe connection from an external fluid source such as pump P is made up with port means 223. Fluid is then injected through port means 223 into fluid chamber 265 until sufficient fluid pressure is present within chamber 265 to overcome the force of spring 251 and fluid pressure within passageway 222 acting upon the first seal means. The diameter of the line contact between taper 237 and ring 229 is selected to be larger than the diameter of the contact between seal 260 and passageway 222. This difference in diameters results in fluid pressure within first longitudinal passageway 222 biasing poppet means 230 towards its second position. When fluid pressure within chamber 265 exceeds a preselected value, poppet means 230 will shift to its second position (not shown) allowing fluid to be injected from chamber 265 through openings 275, bore 234, and first longitudinal passageway 222 into bore 204 of lubricator section 200.

The previous description is explanatory of only three embodiments of the present invention. Those skilled in the art will see various changes and modifications to the purge and injection valve without departing from the scope of the present invention which is defined in the claims.

What is claimed is:

1. A valve comprising:
   a. a housing having a first longitudinal passageway extending therethrough;
   b. a poppet means slidably disposed within the first longitudinal passageway;
   c. the poppet means having a longitudinal bore extending therethrough;
   d. first seal means for blocking fluid flow between the exterior of the poppet means and the interior of the first longitudinal passageway;
   e. second seal means for blocking fluid flow between the exterior of the poppet means and the interior of the first longitudinal passageway;
   f. the first and second seal means spaced longitudinally from each other and partially defining a fluid chamber within the first longitudinal passageway;
   g. port means for communicating fluid from the exterior of the housing to the fluid chamber;
   h. the poppet means having a first position in which the first seal means blocks fluid communication between the chamber and other portions of the first longitudinal passageway and a second position in which the first seal means allows fluid communication between the chamber and other portions of the first longitudinal passageway;
   i. means for biasing the poppet means towards its first position;
   j. an opening through the poppet means communicating between the longitudinal bore and the first longitudinal passageway;
   k. the first seal means located between the opening and the fluid chamber; and
   l. means for shifting the poppet means towards its second position comprising;
   the longitudinal bore sized to receive a wireline therein; and the end of the poppet means opposite the biasing means engageable with a well tool attached to the wireline whereby tension on the wireline can be transmitted through the well tool to the poppet means to overcome the force of the biasing means.

2. A valve, as defined in claim 1, wherein the first seal means further comprises:
   a. a metal seat carried by the housing within the first longitudinal passageway; and
   b. a tapered outside diameter portion of the poppet means sized to engage the metal seat.

3. A valve, as defined in claim 2, wherein the metal seat forms a sharp line contact when engaged with the tapered portion of the poppet means.

4. A valve, as defined in claim 1, wherein the means for shifting the poppet means comprises:
   a. piston means attached to the exterior of the poppet means and located between the first seal means and the biasing means; and
   b. means for communicating fluid between the exterior of the housing and the piston means opposite the biasing means whereby increased fluid pressure acting upon the piston means can overcome the biasing means and shift the poppet means towards its second position.

5. A valve, as defined in claim 1, wherein the means for shifting the poppet means comprises:
   a. the second seal means continuously blocking fluid flow as the poppet means shifts between its first and second position; and
   b. injecting fluid at sufficient pressure through the port into the fluid chamber to act upon the first seal means and to overcome the force of the biasing means.

6. A valve comprising:
   a. a housing having a first longitudinal passageway extending therethrough;
   b. a poppet means slidably disposed within the first longitudinal passageway;
   c. the poppet means having a longitudinal bore extending therethrough;
   d. first seal means for blocking fluid flow between the exterior of the poppet means and the interior of the first longitudinal passageway;
   e. second seal means for blocking fluid flow between the exterior of the poppet means and the interior of the first longitudinal passageway;
   f. the first and second seal means spaced longitudinally from each other and partially defining a fluid chamber within the first longitudinal passageway;
   g. port means for communicating fluid from the exterior of the housing to the fluid chamber;
   h. the poppet means having a first position in which the first seal means blocks fluid communication between the chamber and other portions of the first longitudinal passageway and a second position in which the first seal means allows fluid communication between the chamber and other portions of the first longitudinal passageway;
   i. means for biasing the poppet means towards its first position;
   j. an opening through the poppet means communicating between the longitudinal bore and the first longitudinal passageway;
   k. the first seal means located between the opening and the fluid chamber;
   l. means for attaching the housing to a wireline lubricator assembly;
   m. the biasing means comprising a spring disposed between a shoulder formed on the inside diameter of the housing and a similar shoulder on the poppet means;
   n. the longitudinal bore extending completely through the poppet means and sized to slidably receive a flexible wireline therein; and
   o. packing means carried within the longitudinal bore to wipe the wireline as it slides through the bore.

7. A valve, as defined in claim 6, wherein the first seal means further comprises:
   a. a metal seat carried by the housing within the first longitudinal passageway; and
   b. a tapered outside diameter portion of the poppet means engageable with the metal seat.

8. A valve, as defined in claim 7, wherein the metal seat forms a sharp line contact when engaged with the tapered portion of the poppet means.

* * * * *